United States Patent [19]
Papiernik

[11] Patent Number: 5,832,188
[45] Date of Patent: Nov. 3, 1998

[54] CLOCK-SYNCHRONIZED MOTION CONTROL IN DISCRETE-TIME SAMPLING SYSTEMS

[75] Inventor: Wolfgang Papiernik, Neunkirchen, Germany

[73] Assignee: Siemens Aktiengesellschaft, Munich, Germany

[21] Appl. No.: 722,445

[22] Filed: Oct. 10, 1996

[30] Foreign Application Priority Data

Oct. 10, 1995 [EP] European Pat. Off. ............... 95115952

[51] Int. Cl.[6] ...................................................... G05B 15/00
[52] U.S. Cl. .................................. 395/80; 395/87; 395/97
[58] Field of Search ................... 395/80, 87, 97

[56] References Cited

U.S. PATENT DOCUMENTS 5,379,367  1/1995  Song .......................................... 395/87

FOREIGN PATENT DOCUMENTS

| 0 378 708 | 7/1990 | European Pat. Off. . |
| 0 419 706 | 4/1991 | European Pat. Off. . |
| 94116655 | 8/1996 | European Pat. Off. . |
| 41 07 514 | 9/1992 | Germany . |
| 90/10930 | 9/1990 | WIPO . |
| 95/10076 | 4/1995 | WIPO . |

Primary Examiner—Allen R. MacDonald
Assistant Examiner—Jeffrey S. Smith
Attorney, Agent, or Firm—Kenyon & Kenyon

[57] ABSTRACT

A method and device for clock-synchronized motion control in discrete-time sampling systems is provided, in particular for use in numerical control systems for machine tools and robots. The method includes the derivation of any order m from the tool path feedrate (v or $x_2$) or of any order m+1 from the position (s or $x_1$) serving as the manipulated variable (u), the acceleration (a or $x_3$) or the jerk limitation (r or $x_4$) preferably being used. The exact control sequence ($\vec{u}$) for the motion control is determined from the n=m+1 discrete-time system matrix equations of the sampling system, given an initial state ($\vec{x}_k$) and desired state vector ($x \vec{x}_{k+v}$) The manipulated variable (u) is changed in accordance with the specific values of the control sequence ($\vec{u}$) within the time reference (k*T) of the sampling system, in particular in the interpolation clock cycle when working with numerical control systems for machine tools and robots. If the order n of the system-matrix equation system is smaller than the number of sampling intervals (v) for traveling from the initial state ($\vec{x}_k$) into the desired state ($\vec{x}_{k+v}$), the number (v-n) of additional degrees of freedom conditional upon this is used to fulfill secondary criteria, in particular to avoid overly stressing mechanical systems being used by minimizing the average manipulated variable energy.

12 Claims, 10 Drawing Sheets

CLOCK-SYNCHRONIZED MOTION CONTROL IN DISCRETE-TIME SAMPLING SYSTEMS

FIELD OF THE INVENTION

The present invention relates to a method and a corresponding device for clock-synchronized motion control in discrete-time sampling systems, in particular for use in numerical control systems for machine tools and robots.

BACKGROUND OF THE INVENTION

In discrete-time sampling systems, e.g., when working with numerically controlled machine tools and robots, a manipulated variable for motion control can only be changed, as a rule, within a fixed time reference of the control, i.e., within the interpolation clock cycle when working with numerical control systems for machine tools and robots. However, no exact means for achieving a time optimal and clock-synchronized motion control of such discrete-time sampling systems has been disclosed in known methods heretofore. For this reason, alternative arrangements exist for solving this problem in different ways.

German reference no. 41 07 514 A1 describes setting up discrete-time closed loops, which aid in approaching the target with control. However, such a method can only be carried out satisfactorily when the time reference is small compared to the transient response of the control—a so-called quasi continuous action—and, as a rule, has been used successfully in elevators, hoisting cages and railroads. However, in the application area of numerically controlled machine tools, the jerk and acceleration phases lie in the order of magnitude of the interpolation clock cycle, thus of the time reference, so that there is no quasi continuous action. Accordingly, the known process is ruled out for such an application as it is generally not feasible.

The dissertation "Bahnplanung und Bahnführung von Industrierobotern" [Trajectory Planning and Control for Industrial Robots], J. Olomski, Braunschweig, Wiesbaden: Vieweg 1989, Fortschritte der Robotik [Advances in Robotics] volume 4, pages 42 to 53, describes computing the optimal manipulated variable curve for a time-continuous system and approximating the continuous instants on the basis of the discrete time reference. Since, in this case, the manipulated variable curve is established independently of the interpolation clock grid, jumps appear in the acceleration profile, which, given a control with moment precontrol, result in increased stressing of the mechanical systems being used. European Patent EP-0 419 706 B1 entitled "Verfahren zur numerischen Positions- oder Bahnsteuerung" [Method for Numerical Position or Path Control] describes the precise computation of an acceleration-controlled motion profile, where the time discretization is considered. In addition, jerk limitation is carried out in that the acceleration values are filtered through mean value generation. However, since in this case the jerk cannot be specified causally, but rather only indirectly from the acceleration values, problems arise in calculating deceleration distances. To be able to simply calculate a deceleration distance, the motion profile to be traveled of the individual data sets must be known in advance. However, an inherent disadvantage of this procedure is that it goes counter to desired on-line override changes.

European Patent Application EP-9411665.5 entitled "Ruckbegrenzte Geschwindigkeitsführung" [Rate-of-Change Limited Velocity Control] proposes creating additional degrees of freedom by introducing an additional phase each time nominal velocity is approached and when decelerating into the target point. The nominal velocity is approached nearly exactly, because the jerk limitation in the additionally introduced phase, i.e., the transition clock cycle phase to nominal velocity, is allowed to change asynchronously. The approach into the target position is likewise reached nearly exactly when the acceleration prevailing at the instant deceleration begins is equal to zero. However, this condition is rarely satisfied—especially given short travel paths—, so that here, as well, the continuous instants must be approximated through the discrete time reference.

Thus, none of the methods indicated for solving the problem is able to control motion in discrete sampling systems in exact clock-controlled synchronism or in a time-optimal manner.

OBJECTS AND SUMMARY OF THE INVENTION

Therefore, an object of the invention is to provide a method as well as a corresponding device of the type mentioned at the outset that will enable motion to be controlled in discrete-time sampling systems, where the manipulated variable can only change within the fixed time reference or interpolation clock cycle of the control, in exact clock-controlled synchronism, as well as in a time-optimal manner.

This objective is achieved in accordance with the invention by the following process steps:

1.1 the derivation of any order m from the tool path feedrate or of any order m+1 from the position serves as the manipulated variable, the acceleration or the jerk limitation preferably being used;

1.2 the exact control sequence for the motion control is determined from the n=m+1 discrete-time system matrix equations of the sampling system, given an initial state and desired state vector;

1.3 the manipulated variable is changed in accordance with the specific values of the control sequence within the time reference of the sampling system, in particular in the interpolation clock cycle when working with numerical control systems for machine tools and robots.

In a first advantageous embodiment of the method in accordance with the present invention, a mathematical property of the applied system-matrix equation system is used to optimize the precisely clock-synchronized motion control in light of the factors influencing the discrete-time sampling system, especially in light of the dynamic response of electrically driven factors. This is achieved by the following further process step:

2.1 the number of additional degrees of freedom conditional upon this is used to fulfill secondary criteria, in particular to avoid stressing mechanical systems being used by minimizing the average manipulated variable energy.

In another advantageous embodiment of the method in accordance with the present invention, a control sequence is determined for a method for attaining a predetermined nominal velocity for a motion control, which takes into consideration the dynamic capabilities of the underlying discrete-time sampling system, in particular of an electrical drive, so that the motion control can be carried out in a time optimal manner. To this end, travel toward a predetermined nominal velocity takes place in accordance with the following process steps:

3.1 The acceleration continues to be built up with the maximum permissible jerk for as long as it is not imminent that the maximum permissible acceleration will be exceeded in the subsequent sampling period, and the jerk is then reduced to the extent that the maximum permissible acceleration is exactly reached at the following sampling instant;

3.2 when the maximum permissible acceleration is reached, acceleration is carried out at this level toward nominal velocity;

3.3 at the same time, it is continually checked, while retaining the current manipulated variable, whether the acceleration reached can be reduced to zero in the remaining sampling periods, within the framework of looking ahead at the following sampling instant or also within an interval of following sampling instants, while allowing for given acceleration and jerk possibilities in the remaining sampling periods;

3.4 if this is no longer the case for at least one of the sampling instants checked for future purposes, then the acceleration is reduced at the earliest sampling instant that precedes this sampling instant with as negative as possible jerk, wherever possible with the maximum permissible negative jerk, so as to allow the nominal velocity to be reached at the specified instant without overshooting it.

In another advantageous embodiment of the method in accordance with the present invention equated with the previous embodiment, a control sequence for deceleration into a specified target state is made possible in a time-optimal manner while taking into consideration the dynamic response of the underlying discrete-time sampling system, in particular of an electrical drive. To this end, the deceleration operation into the specified target state is performed in accordance with the following process steps:

4.1 a possibly still existing positive acceleration is reduced to zero with as negative as possible jerk, wherever possible with the maximum permissible negative jerk;

4.2 the negative acceleration required for the deceleration is likewise set up with as negative as possible jerk, wherever possible with the maximum permissible, negative jerk;

4.3 if the maximum permissible negative acceleration is reached, then deceleration is continued at this negative acceleration with a jerk of zero;

4.4 it is continually checked, while retaining the current manipulated variable, within the framework of looking ahead at the following sampling instant or also within an interval of following sampling instants, whether the remaining path of the block is shorter than the required deceleration distance, while allowing for given acceleration and jerk possibilities in the remaining sampling periods;

4.5 if this is the case for at least one of the sampling instants checked for future purposes, then the negative acceleration is reduced at the earliest sampling instant that precedes this sampling instant with as positive as possible jerk, wherever possible with maximum permissible positive jerk, and the target state is reached.

In an alternative embodiment, a control sequence is likewise determined for a deceleration into a predetermined target state, it not being necessary now to accept any deviations from the time-optimal characteristic curve of the deceleration operation in spite of restrictions in acceleration and jerk, rather the complete dynamic possibilities of the time-continuous sampling system, in particular of an electrical drive, being able to be utilized at any time. To this end, the deceleration operation into the specified target state is performed in accordance with the following process steps:

5.1 a possibly still existing positive acceleration is reduced to zero with as negative as possible jerk, wherever possible with the maximum permissible negative jerk;

5.2 the negative acceleration required for the deceleration is likewise set up with as negative as possible jerk, wherever possible with the maximum permissible negative jerk;

5.3 it is continually checked, while retaining the current manipulated variable, within the framework of looking ahead at the following sampling instant or also within an interval of following sampling instants, whether the remaining path of the block is shorter than the required deceleration distance, while allowing for given acceleration and jerk possibilities in the remaining sampling periods;

5.4 if this is the case for at least one of the sampling instants checked for future purposes, then the acceleration is reduced at the earliest sampling instant that precedes this sampling instant with as negative as possible jerk;

5.5 if, in so doing, the maximum permissible acceleration and/or the maximum permissible jerk is exceeded, then the number of sampling periods for the deceleration operation is increased so as to ensure that the permissible acceleration limit and/or jerk limit is not undershot or is only undershot within the scope of the permissible tolerance, and the operative deceleration point is advanced by as many sampling instants needed so that the target state is reached at an acceleration and jerk of zero.

Another advantageous refinement of the method according to the present invention reduces the computational work required to determine a suitable control sequence for an exact clock-synchronized motion control in the case of a deceleration into a predetermined target state. It makes it possible to simplify the method and reduce the degree of complexity of a control that works according to said method, so that a more cost-effective means for achieving the objective can be realized. To this end, the following alternative process steps are provided:

6.1 A possibly still existing positive acceleration is reduced with as negative as possible jerk to zero by means of discrete-time approximation from the continuously determined deceleration operation;

6.2 the negative acceleration required for deceleration is set up with as negative as possible jerk likewise by means of discrete-time approximation from the continuously determined deceleration operation.

To realize such an advantageous method for clock-synchronized motion control of discrete-time sampling systems in a simpler manner, the objective is achieved using a device with the following elements, which render possible an especially favorable and effective realization:

7.1 means are provided, in particular a microprocessor system, for determining an exact control sequence from a discrete-time system-matrix equation system of the sampling system for the motion control;

7.2 means are provided for influencing the manipulated variable in clock-controlled synchronism in accordance with the determined values of the control sequence;

7.3 means are provided for integrating the manipulated variable in accordance with any desired order n and, thus, for determining the tool path feedrate and the path from the manipulated variable.

The advantages attained with the invention include, in particular, that motion can be controlled in discrete-time sampling systems in exact clock-controlled synchronism and, moreover, optimally with respect to time, in particular, in light of the dynamic possibilities of the discrete-time sampling system. Above all in the case of the application of an electrical drive, the method for determining the control sequence can be carried out in an especially simple and effective manner on the basis of appropriate implementation of the steps for determining the control sequence. Moreover, to determine suitable control sequences, advantageous motion controls are created for a travel toward a predetermined nominal velocity, as well as for a deceleration into a specified target state, which makes it possible for a control sequence to be determined, which optimally utilizes the dynamic possibilities of the discrete-time sampling system and optimizes the control sequence in light of the motion control. With regard to reducing the computational work this entails, alternative procedures are created over and above that which enable a more cost-effective implementation. Furthermore, a device embodying the above-mentioned advantages is created, which, moreover, can be realized cost-effectively with little expenditure, and which works effectively.

Further advantages and inventive details are revealed in the following description of computational fundamentals, as are several application examples based on the drawings and in conjunction with the dependent claims.

BRIEF DESCRIPTION OF THE DRAWINGS

To further elucidate the invention, reference is made to the enclosed drawings, in which.

DETAILED DESCRIPTION

Figure 1:
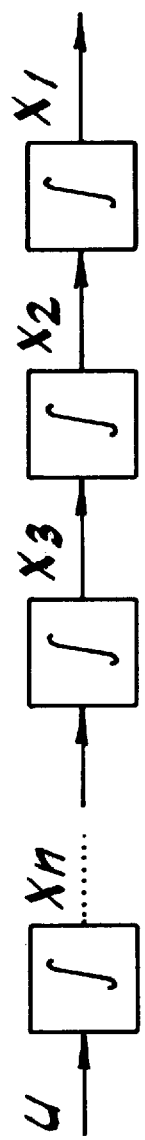
FIG. 1 is a block diagram of a time-continuous system comprising possible manipulated variables for motion control.

When working with the motion control, the m-th derivation of the path velocity v or the m+1-th derivation of the position or of the travel path s serves as the manipulated variable. Preferably, reference is made to the path velocity v, since, as a rule, this is determined directly, i.e., is used to trigger drives. For purposes of illustration, the continuous system can be described by a block diagram with n=m+1 memories or integrators, as shown in FIG. 1. In this diagram:

$x_1 := s =$ travel path or position $x_2 := v =$ velocity $x_3 := a =$ acceleration $x_4 := r =$ jerk $$\frac{dx_n}{dt} = \dot{x}_n := u = \text{manipulated variable}$$

The flow of information of this block diagram can be described mathematically by the following differential equation system (1):

$$\begin{bmatrix} \dot{x}_1 \\ \dot{x}_2 \\ \dot{x}_3 \\ \ldots \\ \ldots \\ \dot{x}_n \end{bmatrix} = \begin{bmatrix} 0 & 1 & 0 & 0 & \ldots & 0 \\ 0 & 0 & 1 & 0 & \ldots & 0 \\ 0 & 0 & 0 & 1 & 0 & \ldots & 0 \\ \ldots & & & & & \\ \ldots & & & & 0 & 1 \\ 0 & 0 & \ldots & & 0 & 0 \end{bmatrix} \cdot \begin{bmatrix} x_1 \\ x_2 \\ x_3 \\ \ldots \\ \ldots \\ x_n \end{bmatrix} + \begin{bmatrix} 0 \\ 0 \\ 0 \\ \ldots \\ \ldots \\ 1 \end{bmatrix} \cdot u \quad (1)$$

This can be simply expressed as a vector or matrix notation as follows:

$$\vec{\dot{x}} = F \cdot \vec{x} + \vec{g} \cdot u$$

If one solves the differential equation system (1), then for instants $t \geq t_0$, one obtains:

$$\vec{x}(t) = e^{F(t-t_0)} \cdot \vec{x}(t_0) + \int_{t_0}^{t} e^{F(t-\tau)} \cdot \vec{g} \cdot u(\tau) d\tau \quad (2)$$

Here, $\vec{x}(t_0)$ describes the initial state of the system at the instant $t_0$.

Figure 2:
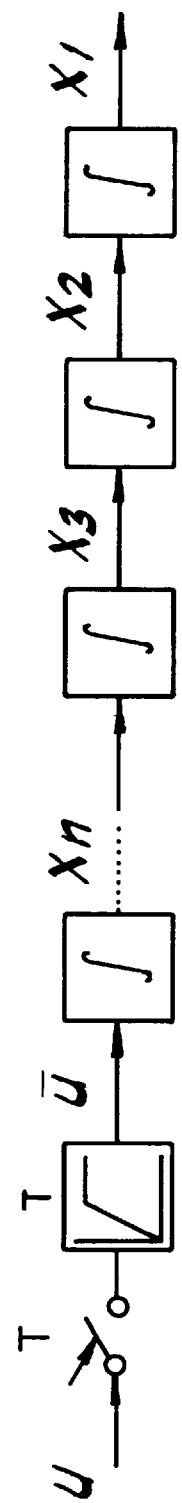
FIG. 2 is a block diagram of a discrete-time sampling system comprising possible manipulated variables for motion control.

If a sample/hold element, also described as sample & hold element, is connected in incoming circuit to the continuous system of FIG. 1, then one obtains a discrete-time sampling system, in which the line motion input—the manipulated variable u—can only change at the discrete sampling instants k·T, where k=0, 1, 2, ... and T=sampling time. FIG. 2 illustrates the block pattern of such a discrete-time sampling system.

Figure 3:
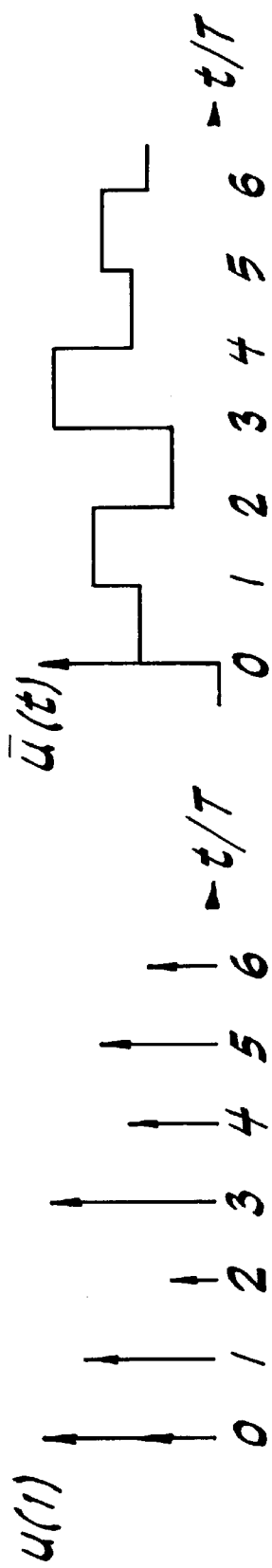
FIG. 3 a diagram of input and output signals of a sample-&-hold element for generating discrete-time values.

In FIG. 3, input signals of a sample & hold element are shown on the basis of a numerical sequence u', and the corresponding output signals $\bar{u}$ are shown, which are plotted on a time axis t/T scaled over the sampling periods T. The numerical sequence u' is generated, for example, by a computer. With the aid of a sample & hold element, a stair-step curve $\bar{u}$ is formed, which is used to drive the continuous subsystem.

Since the pattern of the output signals $\bar{u}(t) = u_k =$ const is constant for instants $k \cdot T \leq t < (k+1) \cdot T$ within individual sampling periods, the state variables can be simply determined for the sampling system with $k \cdot T = t_0$ at the sampling instant $(k+1) \cdot T$ from the prescribed calculation (2) as follows:

$$\vec{x}[(k+1)T] = e^{F \cdot T} \cdot \vec{x}(kT) + \int_{kT}^{(k+1)T} e^{F[(k+1)T-\tau]} \cdot \vec{g} \cdot u_k d\tau$$

-continued $$\vec{x}[(k+1)T] = e^{F \cdot T} \cdot \vec{x}(kT) + \int_{kT}^{(k+1)T} e^{F[(k+1)T-\tau]} \cdot \vec{g} d\tau \cdot u_k$$

If one substitutes $(k+1)T-\tau=v$, then this yields the following prescribed calculation (3):

$$\vec{x}[(k+1)T] = e^{F \cdot T} \cdot \vec{x}(kT) + \int_0^T e^{F \cdot v} \cdot \vec{g} dv \cdot u_k \quad (3)$$

This prescribed calculation can also be simply expressed in a vector or matrix notation:

$$\vec{x}_{k+1} = A \cdot \vec{x}_k + \vec{b} \cdot u_k$$

The discrete system matrix $A = e^{F \cdot T}$ can be simply determined, inter alia, by applying the Laplace transformation:

$$A = L^{-1}[(sI-F)^{-1}]_{t=T}$$

Here, s describes the Laplace operator, I a unit matrix.

Specially for the case of the n-memory system, as shown in FIG. 1 and FIG. 2, it follows with (3) and (1):

$$\begin{bmatrix} x_{1,k+1} \\ x_{2,k+1} \\ x_{3,k+1} \\ \cdots \\ \cdots \\ x_{n,k+1} \end{bmatrix} = \begin{bmatrix} 1 & T & T^2/2 & T^3/3! & \cdots & T^{(n-1)}/(n-1)! \\ 0 & 1 & T & T^2/2 & \cdots & T^{(n-2)}/(n-2)! \\ 0 & 0 & 1 & T & \cdots & T^{(n-3)}/(n-3)! \\ \cdots & & & & & \cdots \\ \cdots & & & & & \cdots \\ 0 & 0 & 0 & 0 & & 1 \end{bmatrix} \cdot \begin{bmatrix} x_{1,k} \\ x_{2,k} \\ x_{3,k} \\ \cdots \\ \cdots \\ x_{n,k} \end{bmatrix} + \begin{bmatrix} T^n/n! \\ T^{(n-1)}/(n-1)! \\ T^{(n-2)}/(n-2)! \\ \cdots \\ \cdots \\ T \end{bmatrix} \cdot u_k \quad (4)$$

This can likewise be expressed in simplified terms in a vector or matrix notation:

$$\vec{x}_{k+1} = A \cdot \vec{x}_k + \vec{b} \cdot u_k$$

In an n-memory system, A represents an n×n-matrix and $\vec{b}$ an n×1-vector. With A and $\vec{b}$, the state vector $\vec{x}_{k+v}$ can now be calculated at a sampling instant $(k+1) \cdot T$ from the state vector $\vec{x}_k$ and from the manipulated variable $u_k$ of a preceding sampling instant $k \cdot T$.

Accordingly, it follows from (4) for the instant $(k+2) \cdot T$:

$$\vec{x}_{k+2} = A \cdot \vec{x}_{k+1} + \vec{b} \cdot u_{k+1} = A \cdot [A \cdot \vec{x}_k + \vec{b} \cdot u_k] + \vec{b} \cdot u_{k+1}$$

Or represented more clearly $$\vec{x}_{k+2} = A^2 \cdot \vec{x}_k + [A \cdot \vec{b} \quad \vec{b}] \cdot \begin{bmatrix} u_k \\ u_{k+1} \end{bmatrix}$$

It follows accordingly for the instant $(k+3) \cdot T$:

$$\vec{x}_{k+3} = A^3 \cdot \vec{x}_k + [A^2 \cdot \vec{b} \quad A \cdot \vec{b} \quad \vec{b}] \cdot \begin{bmatrix} u_k \\ u_{k+1} \\ u_{k+2} \end{bmatrix}$$

Thus, for a general instant $(k+v) \cdot T$, the following generally valid prescribed calculation (5) can be stated:

$$\vec{x}_{k+v} = A^v \cdot \vec{x}_k + \underbrace{[A^{v-1} \cdot \vec{b} \quad A^{v-2} \cdot \vec{b} \quad \cdots \quad A \cdot \vec{b} \quad \vec{b}]}_{S} \cdot \underbrace{\begin{bmatrix} u_k \\ u_{k+1} \\ \cdots \\ u_{k+v-2} \\ u_{k+v-1} \end{bmatrix}}_{u} \quad (5)$$

Thus, the state vector of a discrete-time sampling system can be calculated at the instant $(k+v) \cdot T$, when the initial state $\vec{x}_k$ of the system at the instant $k \cdot T$, as well as the control sequence therebetween, represented by the control vector $\vec{u}$, are known.

Conversely, however, in accordance with the present invention, the control sequence $\vec{u}$, which is required to transform a sampling system from a given initial state into a desired end state, is now calculated from equation (5). To achieve an exact clock-synchronized motion control, the manipulated variable $\vec{u}$ is then modified at the sampling instants to conform with the values of the control sequence $\vec{u}$. To this end, the computational specification (5) is solved for the control sequence $\vec{u}$:

$$\vec{u} = S^{-1} \cdot [\vec{x}_{k+n} - A^n \cdot \vec{x}_k] \quad (6)$$

To transform a system of the order n from an initial state into a desired target point, at least n switching operations—synonymous with n sampling intervals $n \cdot T$—are required. One also speaks in this connection of a so-called dead-beat action. In this case, the matrices $A^n$ as well as S have the dimension n×n, so that exactly n equations for the n unknown manipulated variables result.

For v>n, thus for the case that the number of sampling periods available for the motion control is greater than the order of the system of equations, such a system of equations is, however, under-determined, which has as a consequence that an infinite number of control sequences exist to get into the target point.

When one solves prescribed calculation (5) for $S \cdot \vec{u}$, this becomes immediately clear:

$$\begin{bmatrix} S_{11} & S_{12} & \cdots & S_{1n} & S_{1n+1} & \cdots & S_{1v} \\ S_{21} & S_{22} & \cdots & S_{2n} & S_{2n+1} & \cdots & S_{2v} \\ S_{31} & S_{32} & \cdots & S_{3n} & S_{3n+1} & \cdots & S_{3v} \\ \vdots & & & & & & \vdots \\ S_{n1} & S_{n2} & \cdots & S_{nn} & S_{nn+1} & \cdots & S_{nv} \end{bmatrix} \cdot \begin{bmatrix} u_k \\ u_{k+1} \\ u_{k+2} \\ \vdots \\ u_{k+n-1} \\ u_{k+n} \\ u_{k+n+1} \\ \vdots \\ \vdots \\ u_{k+v-1} \end{bmatrix} = \begin{bmatrix} x_{1k+v} \\ x_{2k+v} \\ x_{3k+v} \\ \vdots \\ x_{nk+v} \end{bmatrix} - \begin{bmatrix} A_{11} & \cdots & A_{1n} \\ A_{21} & \cdots & A_{2n} \\ A_{31} & \cdots & A_{3n} \\ \vdots & & \vdots \\ A_{n1} & \cdots & A_{nn} \end{bmatrix} \cdot \begin{bmatrix} x_{1k} \\ x_{2k} \\ x_{3k} \\ \vdots \\ x_{nk} \end{bmatrix}$$

With the v control values, in the same way as before, only n equations are to be satisfied. Thus, in addition, one now has (v−n) degrees of freedom, which can be used in accordance with the invention to satisfy a secondary criterion.

To avoid overly stressing the mechanical system of the machine tool, it is beneficial to minimize the sum of the squares of the control sequence, which corresponds to the average manipulated variable energy, concurrently with the time-optimal motion control. This is expressed mathematically by the following relation:

$$\vec{u}^T \cdot \vec{u} = \sum_{i=0}^{v-1} u_{k+i}^2 \overset{!}{=} \text{Min}$$

This condition is then satisfied exactly when the vector $\vec{u}$, the control sequence, satisfies the equation $$u = \underbrace{S^T \cdot (S \cdot S^T)^{-1}}_{S^+} \cdot (x_{k+v} - A^v \cdot X_k) \tag{7}$$

Since $S^+ \cdot S$ yields the unit matrix, $S^+$ is also designated as the "pseudo-inverse matrix" of S.

The preceding considerations are applied in the following exemplary embodiment to the case of motion control, where the jerk r is selected as the manipulated variable. Of course, to implement the method according to the invention, as well as to operate a corresponding device, any other desired derivations of path velocity v, in particular also the acceleration a, can be drawn upon.

Figure 4:
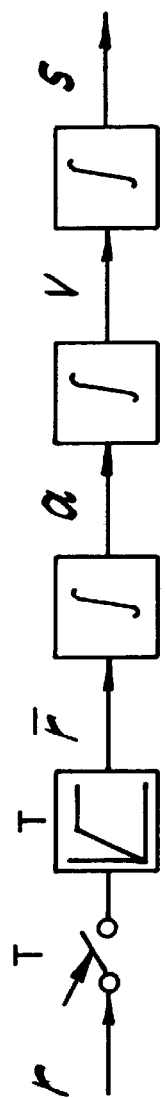
FIG. 4 is a block diagram of a discrete-time system with a manipulated variable based on the example of the jerk r.

For the case of the exemplary embodiment, the block diagram is simplified, as shown in FIG. 4, and the discrete system equations (4) are simplified accordingly:

$$\begin{bmatrix} s_{k+1} \\ v_{k+1} \\ a_{k+1} \end{bmatrix} = \begin{bmatrix} 1 & T & T^2/2 \\ 0 & 1 & T \\ 0 & 0 & 1 \end{bmatrix} \cdot \begin{bmatrix} s_k \\ v_k \\ a_k \end{bmatrix} + \begin{bmatrix} T^3/6 \\ T^2/2 \\ T \end{bmatrix} \cdot r_k \tag{8}$$

In principle, two different motion sections occur in this case. One is approaching a programmed nominal velocity $v_{nominal}$ [$v_{soll}$], illustrated in FIG. 5 by $v^w$, the other is deceleration into a target state, which is to be introduced when the remaining travel path of the block threatens to become shorter than the required deceleration travel path.

Figure 5:
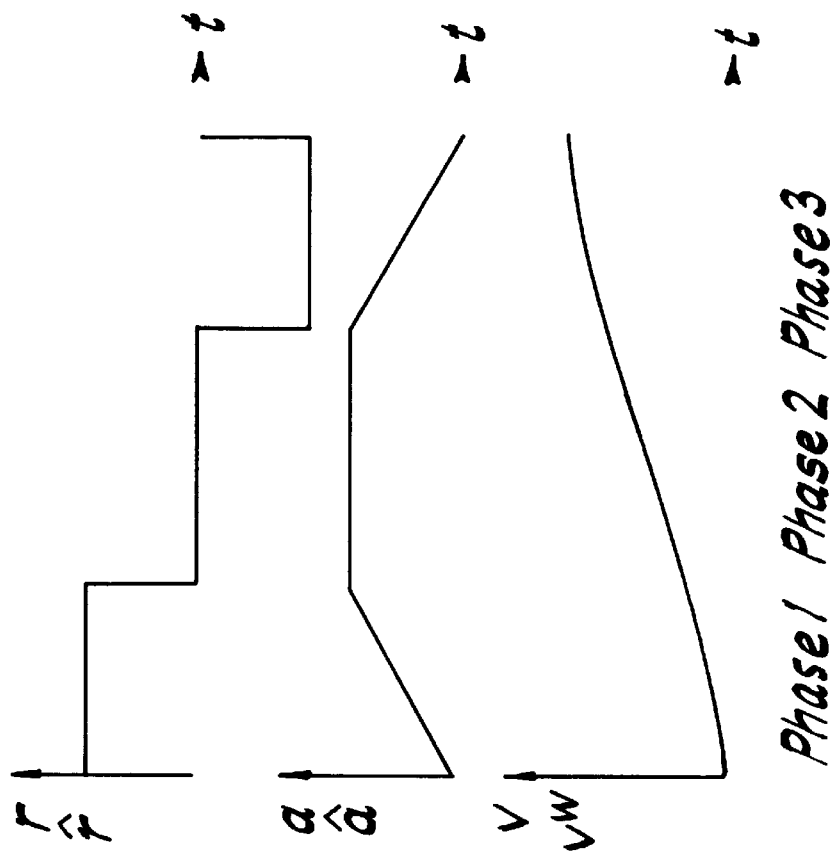
FIG. 5 is a graph of a characteristic curve of jerk, acceleration, and velocity when approaching a specified nominal velocity.

In continuous time, the approach to a nominal velocity $v_{nominal}$ or $v^w$ is composed of a maximum of three phases, which are illustrated in FIG. 5 on the basis of the characteristic curve of jerk r, acceleration a, and path velocity v.

In phase 1, the maximum permissible acceleration $\hat{a}$ is built up with the maximum jerk $\hat{r}$. In phase 2, acceleration takes place with maximum acceleration toward nominal velocity $v_{nominal}$ or $v^w$. In phase 3, the acceleration is reduced again with maximum negative jerk $-\hat{r}$, so that the nominal velocity $v_{nominal}$ or $v^w$ is reached without any overshooting. Phase 2 can be dropped in dependence upon the amounts of $\hat{a}$ and $v^w$.

Figure 6:
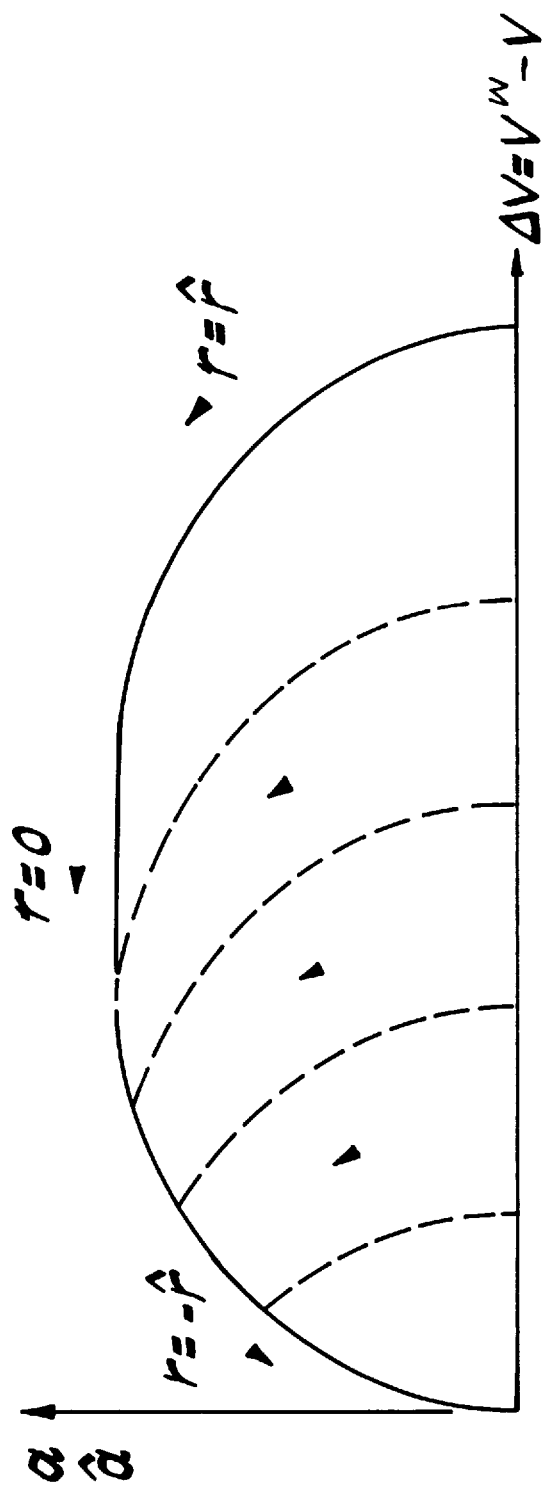
FIG. 6 is a graph of interaction of jerk, acceleration, and velocity in the phase plane when approaching a specified nominal velocity.

FIG. 6 illustrates quite clearly the approach to nominal velocity in the phase plane, where the characteristic curve of the acceleration a(t) is plotted over $\Delta v(t) = v^w - v(t)$. This elucidates the interaction of jerk r, acceleration a, and path velocity v with reference to the nominal velocity $v_{nominal}$ or $v^w$.

The way the motion operation looks is that starting from one of the right parabola branches, for which $r=\hat{r}$, the transition is made to the target or deceleration parabola with $r=-\hat{r}$, the linear portion being run through in between, in some instances, with $a=\hat{a}$ and $r=0$.

To this end, the following equation applies for the target/deceleration parabola:

$$\Delta v_{BP} = \frac{a_{BP}^2}{2 \cdot \hat{r}} \tag{9}$$

For as long as the condition $$\Delta v(t) > \Delta v_{BP}(a(t)) = \frac{a(t)^2}{2 \cdot \hat{r}} \tag{10}$$

is met, acceleration can take place with maximum permissible jerk $\hat{r}$ or with maximum permissible acceleration $\hat{a}$ and $r=0$. If then, in place of (10), the condition (9) is satisfied, the transition is to be made with $-\hat{r}$ to the deceleration parabola, in order to reach the target velocity without any overshooting.

When a specified nominal velocity is approached, the motion control would have to introduce the changeover to the deceleration parabola at the correct instant, which, however, causes problems in sampling systems, since, as a rule, the "correct" instant does not conform—or only conforms purely by coincidence—with the sampling raster.

Therefore, to ensure that the given restrictions $\hat{r}$ and $\hat{a}$ are not exceeded, as a rule, the deceleration to the target velocity has to be begun already before, maximally one clock cycle earlier in the discrete time. It is checked on the basis of the discrete system equations (8), while retaining the manipulated variable u during the next sampling instant, whether condition (10) is still satisfied, otherwise, the deceleration operation is still introduced within the current sampling interval. Within the framework of a so-called "look ahead", more than only the following sampling instant can also be considered. Thus, for example, a previously defined interval of any desired number of sampling instants can be considered, while retaining the manipulated variable u, to determine whether the condition (10) is still satisfied during the next sampling instant each time. If the remaining travel path for a deceleration operation is too short, then the deceleration operation is introduced in the sampling instant that comes before it in the motion control.

The deceleration operation is introduced in this case as follows. First, the time span is calculated, which would be required to reduce the acceleration reached in the sampling instant k·T to zero:

$$T_{Brems\_kont} = \frac{a_k}{\hat{r}}$$

Since the instant $T_{dec\_cont}$ [$T_{Brems\_kont}$], in turn, amounts only purely by coincidence to an integral multiple of the sampling period T, it is rounded up and the discrete deceleration instant is obtained.

$$T_{Brems\_diskret} = ceil\left(\frac{T_{Brems\_kont}}{T}\right) \cdot T := v \cdot T; v \in N \quad (11)$$

Based on the number of sampling intervals v found in accordance with the prescribed calculation (11), the required sequence of manipulated variables $\vec{u}$ used to transform the system into the target state can then be calculated by means of the prescribed calculation (6) or (7)

$$\vec{x}_{k+v} = \begin{bmatrix} v_{k+v} \\ 0 \end{bmatrix} = \begin{bmatrix} 1 & T \\ 0 & 1 \end{bmatrix}^v \cdot \begin{bmatrix} v_k \\ a_k \end{bmatrix} + S \cdot \vec{u}$$

Figure 7:
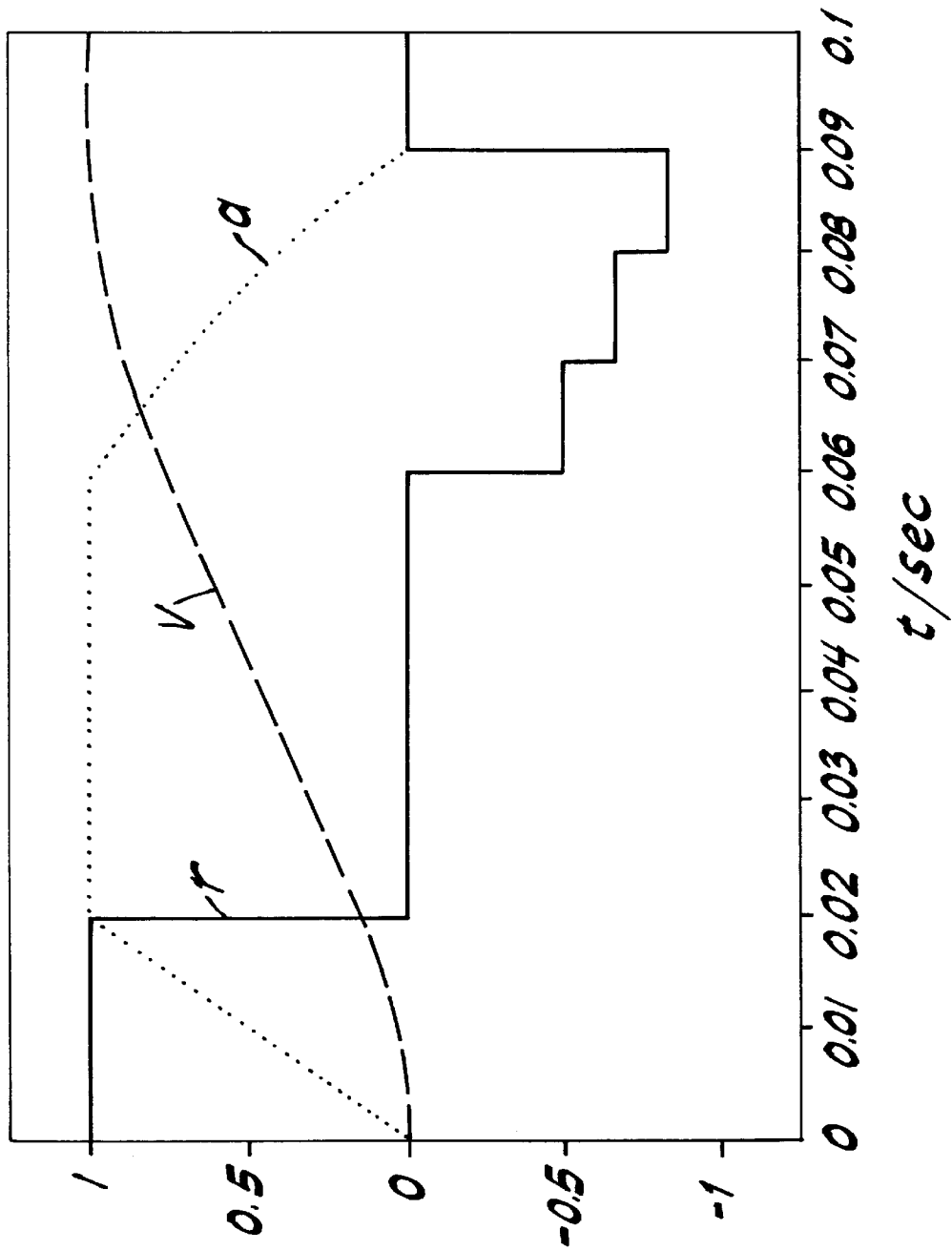
FIG. 7 is a graph of discrete motion control to a specified nominal velocity, with the variables being scaled.

FIG. 7 shows a motion control toward a specified nominal velocity, said motion control being scaled to the machine data and carried out in accordance with this method. The path velocity v is represented by a dashed line curve, the acceleration a by a dotted line curve, and the jerk r by a continuous line curve. The interpolation clock cycle is set at T=10 msec. The underlying machine data amount to:

| | |
|---|---|
| maximum velocity | $\hat{v}$ = 20 m/min; |
| maximum acceleration | $\hat{a}$ = 5 m/sec$^2$; |
| maximum jerk | $\hat{r}$ = 250 m/sec$^3$. |

Figure 8:
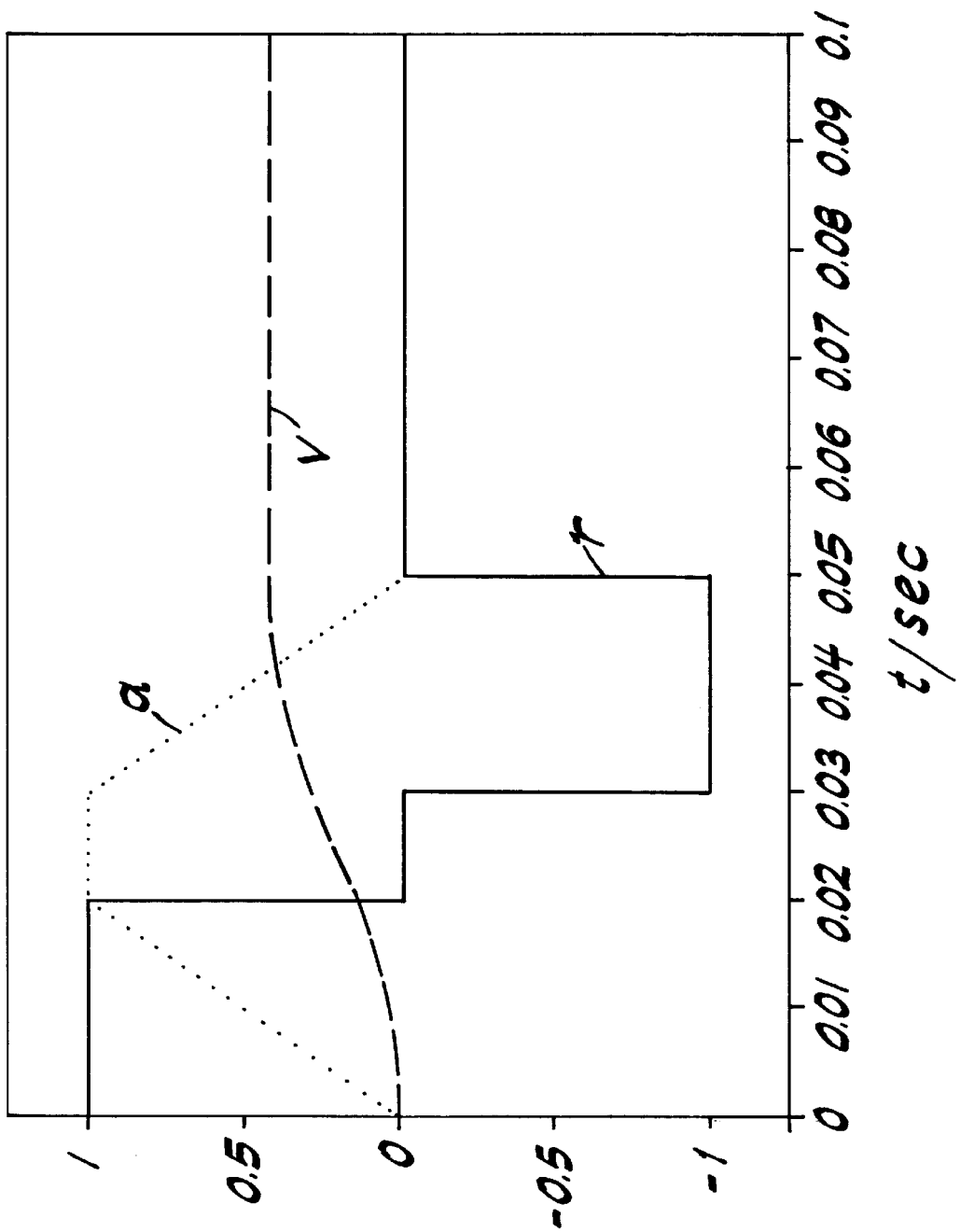
FIG. 8 is a graph of discrete motion control to a specified nominal velocity, with the time reference and time-optimal continuous motion operation coinciding.

It should also be mentioned in this connection that the manipulated-variable sequence $\vec{u}$ calculated on the basis of the pseudo-inverse is identical to the control sequence belonging to the time-optimal motion operation when the sampling time reference fits into the time-optimal, continuous motion operation "random". FIG. 8 shows such a case on the basis of a discrete motion control to a specified nominal velocity v$^w$=0.45·$\hat{v}$. Path velocity v, acceleration a, and jerk r are represented by the line curves elucidated in FIG. 7, the motion state likewise being scaled.

Figure 9:
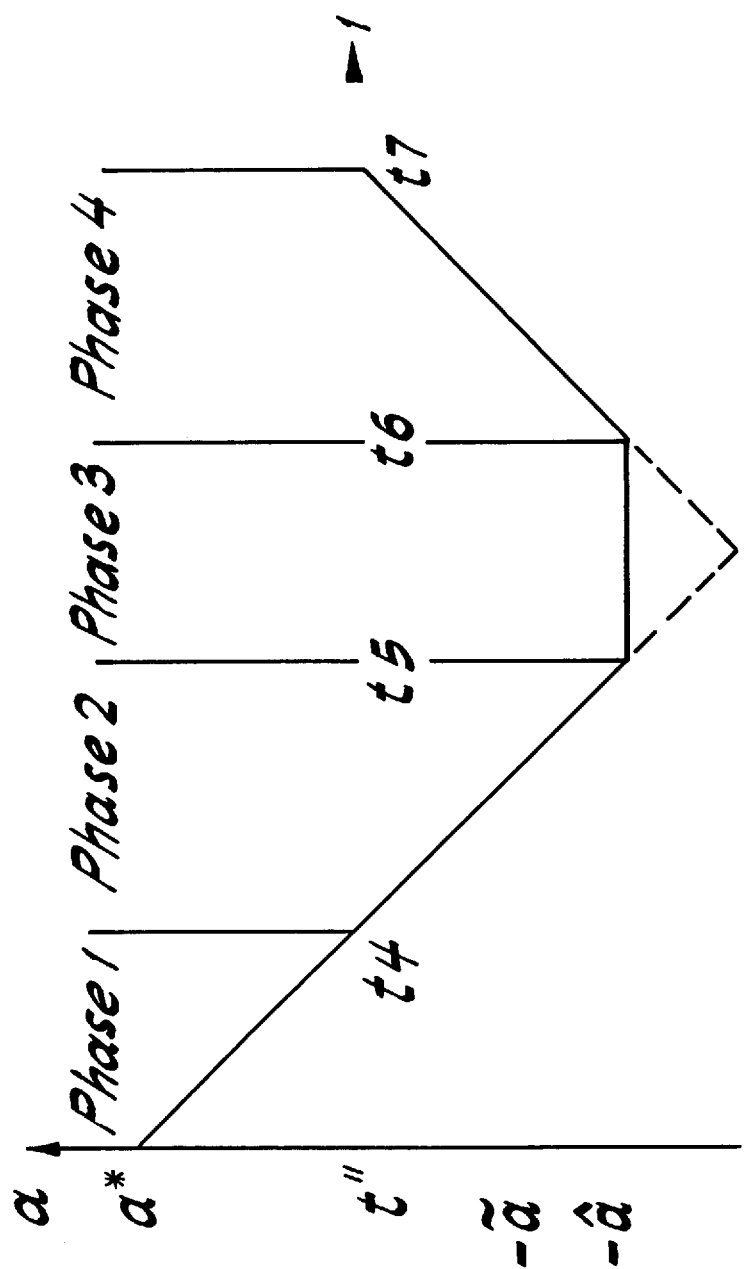
FIG. 9 is a graph of a section of a time-optimal deceleration operation into a specified target position.

The time-optimal deceleration into a target state, which is to be introduced when the remaining travel path of the block threatens to become shorter than the required deceleration travel path, is dependent first of all on whether the maximum acceleration is reached or not during deceleration. Accordingly, a time-continuous deceleration operation is composed of three or four phases, which are shown in FIG. 9. To this end, the characteristic curve of the acceleration a is plotted over the time t, the starting point being any desired state a' at an instant t', from where deceleration is supposed to take place into a target position optimally with respect to time and exactly with respect to target point.

Phase 1 is used to reduce to zero a positive acceleration a' still existing in some instances at the beginning of the deceleration operation t'. Thus, the velocity v still continues to increase in this case. In phase 2, just as in phase 1, the negative acceleration $-\tilde{a}$ required for deceleration into the target is set up with the maximum negative jerk and is to be limited, in some instances to $-\hat{a}$, as indicated by the characteristic curve of the acceleration a that deviates from the dotted line curve. In phase 3, the jerk is equal to zero, deceleration is continued with $-\hat{a}$. Phase 3 is dropped when $|\tilde{a}|<|\hat{a}|$. In phase 4, the negative acceleration $-\tilde{a}$ or $-\hat{a}$ is reduced again with the maximum positive jerk in order to thus achieve the target position with the desired target velocity and a zero acceleration.

As a result, for every desired initial state, all partial times and partial travel paths can be calculated, as can the total deceleration time $t_7-t'$ needed, as well as the total deceleration travel path s($t_7$)-s(t') needed, so that in continuous time, the practical conversion of this time plan can take place without extra work.

In the realization in discrete time, the present invention provides for additional adaptations and optimizations to be made on the basis of the sampling raster. Here, experience has shown that better results can be achieved when the limitations are not taken over directly from continuous time, but rather are established following a separate strategy based on the discretely calculated control sequence. Thus, the dynamic response of active electrical drives allows, for example, the permissible maximum acceleration +/-$\hat{a}$ to be exceeded for a short time by up to 100%. As a result, a deceleration action into a target state in accordance with the previously described method means forgoing dynamic response and velocity. This also seems plausible when one considers that the jerk only assumes the values -1, 0 and +1 in continuous time, while it virtually has a linear, stair-step characteristic curve in the discrete time.

Therefore, initially in calculating the total time $T_{dec_{cont}}$= $t_7-t'$ needed for the time-continuous deceleration operation, the restriction of not exceeding the maximum acceleration $\hat{a}$ and/or the maximum permissible jerk $\hat{r}$, as far as absolute value is concerned, is dropped, so that looking in general at acceleration, a characteristic curve for acceleration a is obtained as drawn in with a dotted line in FIG. 9. The calculated time span is then rounded up in order to obtain an integral multiple of the sampling period T, as when approaching the programmed nominal velocity, as described previously. This is considered in the following prescribed calculation:

$$T_{Brems\_diskret} = ceil\left(\frac{t_7 - t^*}{T}\right) \cdot T := v \cdot T, v \in N. \quad (12)$$

The required manipulated variable sequence $\vec{u}$, in which the target position $S_{target}$ [$S_{ziel}$] is reached with the desired target velocity $V_{target}$ [$V_{ziel}$] and acceleration 0, is then calculated in turn in accordance with prescribed calculation (6) or (7):

$$[\vec{x}_{k+v}] = \begin{bmatrix} s_{Ziel} \\ v_{Ziel} \\ 0 \end{bmatrix} = \begin{bmatrix} 1 & T & T^2/2 \\ 0 & 1 & T \\ 0 & 0 & 1 \end{bmatrix}^v \cdot \begin{bmatrix} s_k \\ v_k \\ a_k \end{bmatrix} + s \cdot \vec{u}$$

Therefore, this prescribed calculation represents a form of the prescribed calculation (5) that is tailored to the exemplary embodiment. Accordingly, travel is undertaken in consideration of the maximum permissible jerk. If it turns out, in this case, that the jerk r and/or the acceleration a is exceeded in this control sequence to an unjustifiable degree, as shown, for example, in FIG. 10 for the acceleration a, then the number of sampling periods v available to the deceleration operation must be increased. For this purpose, the number of clock-pulse periods provided for the deceleration operation continues to be increased until the acceleration limit is no longer exceeded or, given a negative limit of acceleration, is no longer undershot or is only still exceeded within the scope of the permissible tolerance of the dynamic response. This makes it possible to fully utilize the available dynamic response.

Figure 10:
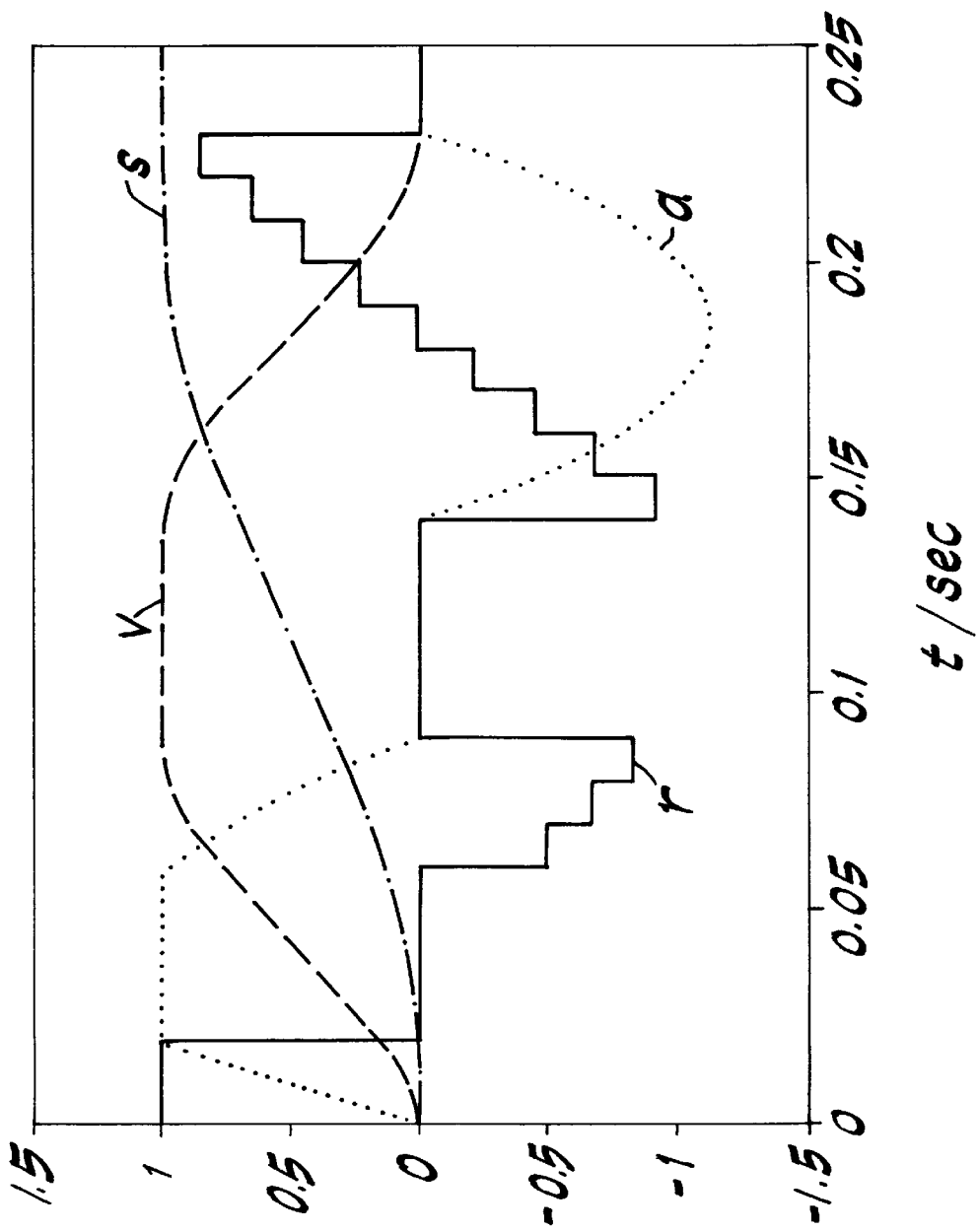
FIG. 10 is a graph of discrete motion control of a deceleration operation into a target position without limitation when decelerating into the target point.

FIG. 10 illustrates a discrete-time motion control with driving up to a specified nominal velocity $v^w = \hat{v}$ and subsequent deceleration into a specified target state where $S_{target} = 47 \cdot 10^{-3}$m, $v_{target} = 0$, $a_{target} = 0$, the position or the travel path s being shown as a dot-dash curve, velocity v as a dashed-line curve, acceleration a as a dotted curve, and the jerk r as a solid-line curve, and being scaled to the machine data. The machine data have the same values as described further above. The acceleration a thereby considerably exceeds the negative limit of acceleration.

Figure 11:
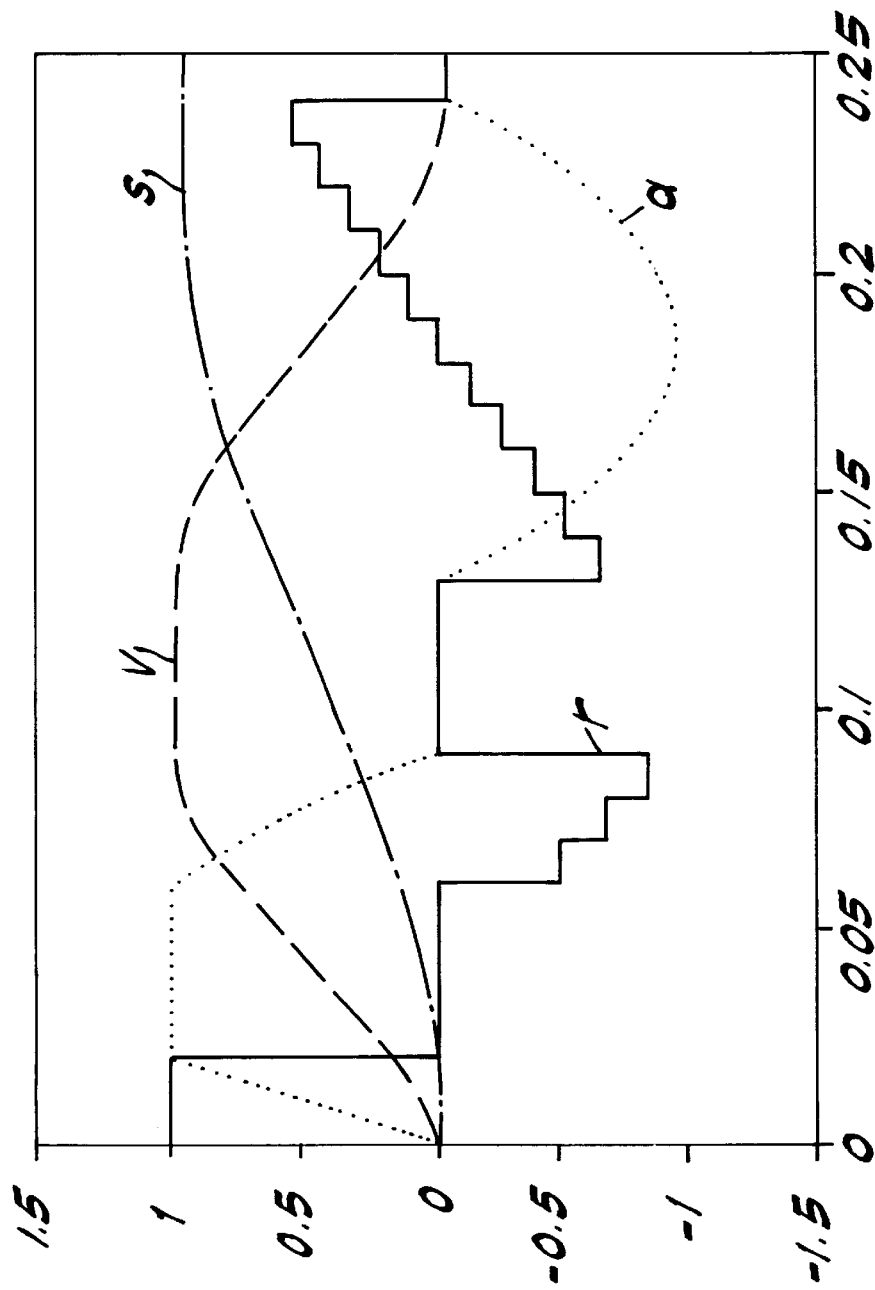
FIG. 11 is a graph of discrete motion control of a deceleration operation into a target position with an additional limitation when decelerating into the target point.

Since the target instant is specified as a fixed instant, the operative deceleration point is advanced, so that the symmetrical characteristic curves of the jerk and also of the acceleration are retained. Moreover, there is a noticeable reduction in the control energy and, consequently, in the loading of the machine. This is especially apparent in FIG. 11, where the discrete motion control from FIG. 10 is shown without limitation when decelerating into the target. Compared to FIG. 10, $v = 11$ instead amounts to 9, and the deceleration operation was already introduced one sampling step sooner.

In addition, many other limitation strategies are conceivable. For example, phases 1 and 2 can be approximated from the deceleration operation calculated continuously in discrete time and the calculation of the discrete control sequence can first be set up as of instant $t_5$. Here, as well, the exact target state is achieved and, in fact, in favor of less computational outlay, however, at the expense of the required control energy. Which strategy is the most favorable for the specific active application must be decided from case to case.

Figure 12:
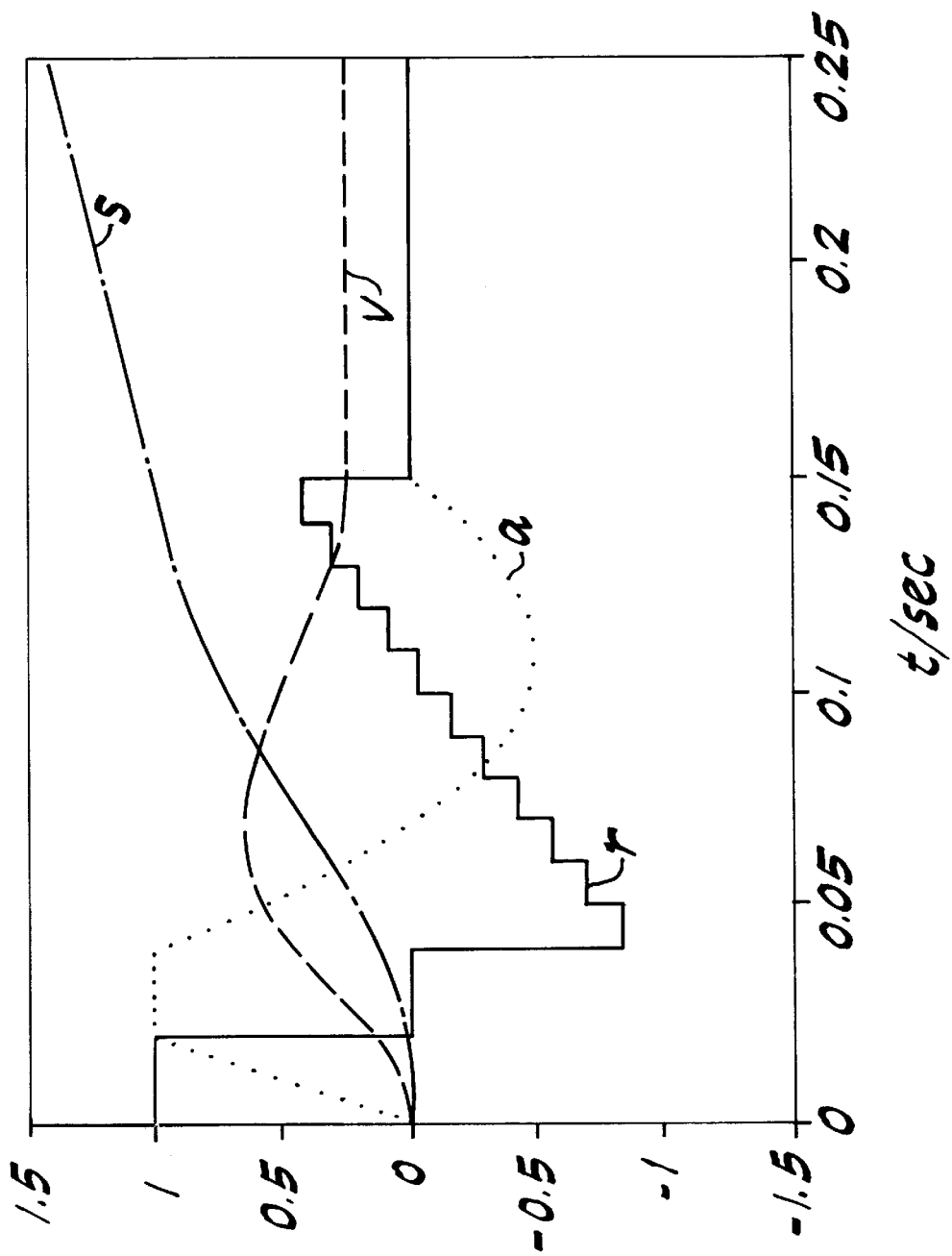
FIG. 12 is a graph of discrete motion control, with the specified nominal velocity not being reached because of insufficient block length.

FIG. 12 shows an example of a discrete motion control, where the specified nominal velocity $v^w = \hat{v}$ is not yet reached in the first place, because the block length is too short. Thus, here, the deceleration instant $t'$ into the target state still falls into the acceleration phase toward the specified nominal velocity $v^w = \hat{v}$. Since, furthermore, in the example, a block end velocity unequal to zero is specified, the travel path increases linearly when reaching the end of the block, as revealed on the scaled travel path by the value 1. For the target state, the underlying values amount to $$S_{target} = 20 \cdot 10^{-3} m, \quad v_{target} = 0.25 \cdot \hat{v}, \quad a_{target} = 0.$$

A device for implementing the method described in the preceding, in particular for implementing the individually represented, prescribed calculations (1) through (12), has means for integrating the manipulated variable u or $x_n$ according to any desired order n for determining the individual parameters used for the motion control up to the travel path s or $x_1$. If the manipulated variable u or $x_n$ is the jerk r or $x_4$, and if the path velocity v or $x_2$ was used as a basis for deriving the manipulated variable u or $x_n$, then $n = m+1 = 3$ integration steps are provided for determining acceleration a or $x_3$, path velocity v or $x_2$ and, finally, travel path s or $x_1$, as shown in FIG. 4.

This can be achieved with the aid of one or more integrators or memory devices or, however, by using a suitable microprocessor-produced algorithm. Furthermore, means are provided for solving the discrete-time system-matrix equation system and, thus, for precisely calculating the control sequence $\vec{u}$. This is preferably done by a microprocessor system using appropriate programming, since the required computational outlay increases considerably depending on the type of motion control and manipulated variable u used. Possible solving strategies are, for example, the Gauβ-Jordan algorithm or iteration methods, such as the newtonian method, the Bernoulli method or the secant method (regula falsi). Above and beyond that, of course, other new methods for implementing solving strategies can be applied in the numerical processing of digital signals. At the same time, an additional advantage associated with using a microprocessor system is that it enables the manipulated variable u or $x_n$ to be integrated. Because the calculation is made in discrete time, no additional integration is necessary in the mathematical sense, since the values are already determined within the scope of the prescribed calculations described previously and are, thus, available. In addition, to influence the manipulated variable u or $x_n$ in clock-controlled synchronism, means are used to control the manipulated variable u or $x_n$ in accordance with the calculated values of the control sequence $\vec{u}$. In particular, this can be a sample & hold element, as previously described and as shown in FIGS. 2 and 4.

The application of the method as well as the device in accordance with the present invention recommends itself, for example, in the numerical control of machine tools and robots. Beyond that, however, an application in any other desired area is conceivable, where an especially precise and clock-synchronized motion control can or must be implemented.

The above descriptions of preferred specific embodiments of the device according to the invention are given for illustrative purposes. They are not exhaustive. Also, a device in accordance with the invention is not limited to the exact form indicated, rather numerous modifications and changes are possible within the scope of the indicated technical teaching. One preferred specific embodiment was selected and described to clarify the principal details of the invention and practical applications to enable one skilled in the art to understand the invention. Many preferred specific embodiments, as well as other modifications come under consideration when working in special application areas.

I claim:

1. A method for clock-synchronized motion control in discrete-time sampling systems, in particular for use in numerical control systems for machine tools and robots, comprising the following steps:
   (a) deriving any order m from a tool path feedrate (v or $x_2$) or any order m+1 from a position (s or $x_1$) to serve as a manipulated variable (u), for which acceleration (a or $x_3$) or jerk limitation (r or $x_4$) are preferred;
   (b) determining an exact control sequence (u) for motion control from n=m+1 discrete-time system matrix equations of the sampling system, given an initial state ($x_k$) and desired state vector ($x_{k+v}$); and
   (c) changing the manipulated variable (u) in accordance with specific values of the control sequence (u) within a clock-controlled time reference (k*T) of the sampling system, in an interpolation clock cycle when working with numerical control systems for machine tools and robots.

2. The method of claim 1, wherein the order n of the system-matrix equation system is smaller than the number of sampling intervals (v) for travel from an initial state ($\vec{x}_k$) into a desired state ($\vec{x}_{k+v}$), the method comprising the additional step of using the number (v−n) of additional degrees of freedom conditional upon these factors to fulfill secondary criteria, in particular to avoid overly stressing mechanical systems being used by minimizing average manipulated variable energy.

3. The method of claim 1, wherein the control sequence ($\vec{u}$) for travel toward a specified nominal velocity is determined in accordance with the following steps:
   (a) continuing the acceleration (a) at the maximum permissible jerk (r̂) for as long as it is not imminent that the maximum permissible acceleration (â) will be exceeded in a subsequent sampling period, and reducing the jerk (r̂) to the extent that the maximum permissible acceleration (â) is reached at the subsequent sampling instant;
   (b) when the maximum permissible acceleration (â) is reached, continuing acceleration at this level toward nominal velocity ($v_{nominal}$);
   (c) at the same time, continually checking, while retaining the current manipulated variable (u), whether the acceleration reached can be reduced to zero in the remaining sampling periods, within the framework of a look ahead at the subsequent sampling instant or also within an interval of following sampling instants, while allowing for given acceleration and jerk possibilities in the remaining sampling periods; and
   (d) if this is no longer the case for at least one of the sampling instants checked for future purposes, then reducing the acceleration (a) at the earliest sampling instant that precedes this sampling instant with as negative as possible jerk (r), wherever possible with the maximum permissible negative jerk (−r̂), so as to allow the nominal velocity ($v_{nominal}$) to be reached at the specified instant without overshooting it.

4. The method of claim 1, wherein the control sequence (u) for a deceleration into a specified target state is determined by the following steps:
   (a) reducing to zero any still existing positive acceleration ($a^*$) with an as negative as possible jerk (r) wherever possible with the maximum permissible, negative jerk (−r);
   (b) establishing the negative acceleration (−a) required for the deceleration with an as negative as possible jerk (r), wherever possible with the maximum permissible negative jerk (−r);
   (c) if the maximum permissible negative acceleration (−â) is reached, then continuing deceleration with the maximum permissible negative acceleration (−â) with a jerk (r) of zero;
   (d) retaining while continually checking the current manipulated variable (u) within the framework of a look ahead at the following sampling instant or also within an interval of following sampling instants, whether the remaining path of the block is shorter than the required deceleration distance, while allowing for given acceleration and jerk possibilities in the remaining sampling periods; and
   (e) if this is the case for at least one of the sampling instants checked for future purposes, then the negative acceleration (−a) is reduced at the earliest sampling instant that precedes this sampling instant with as positive as possible jerk (r), wherever possible with maximum permissible positive jerk (+r), and the target state ($s_{nominal}$) is reached.

5. The method of claim 1, wherein the control sequence ($\vec{u}$) for a deceleration into a specified target state is determined by the following process steps:
   (a) reducing to zero any existing positive acceleration ($a^*$) with an as negative as possible jerk (r), wherever possible with the maximum permissible negative jerk (−r̂);
   (b) establishing the negative acceleration (−a) required for the deceleration with an as negative as possible jerk (r), wherever possible with the maximum permissible, negative jerk (−r̂);
   (c) retaining while continually checking the current manipulated variable (u), within the framework of a look ahead at the following sampling instant or also within an interval of following sampling instants, whether the remaining path of the block is shorter than the required deceleration distance, while allowing for given acceleration and jerk possibilities in the remaining sampling periods;
   (d) if this is the case for at least one of the sampling instants checked for future purposes, then reducing the acceleration (a) at the earliest sampling instant that precedes this sampling instant with an as negative as possible jerk (r); and
   (e) if, in so doing, the maximum permissible acceleration (+â, −â) and/or the maximum permissible jerk (+r̂, −r̂) is exceeded, then increasing the number of sampling periods (v) for the deceleration operation so that the permissible acceleration limit (+â, −â) and/or jerk limit (+r̂, −r̂) is not undershot or is only undershot within a range of permissible tolerance, and the operative deceleration point is advanced by as many sampling instants needed so that the target state ($s_{nominal}$) is reached at an acceleration (a) and jerk (r) of zero.

6. The method of claim 4, wherein
   any still existing positive acceleration ($a^*$) is reduced with as negative as possible jerk (r) to zero by means of discrete-time approximation from the continuously determined deceleration operation; and
   the negative acceleration (−a) required for deceleration is set up with as negative as possible jerk (r) likewise by means of discrete-time approximation from the continuously determined deceleration operation.

7. A device for clock-synchronized motion control in discrete-time sampling systems, in particular for use in numerical control for machine tools and robots, comprising:
   (a) microprocessor means for deriving a manipulated variable (u) in accordance with any order m from the tool path feedrate (v or $x_2$) or any order m+1 from the position (s or $x_1$), as well as for determining an exact control sequence (u) from a discrete-time system-matrix equation system of a sampling system for the motion control given an initial state ($x_k$) and desired state vector ($x_{k+v}$);
   (b) means for influencing a manipulated variable (u) in clock-controlled time reference (k*T) in accordance with determined values of the control sequence (u); and
   (c) means for integrating the manipulated variable (u or $x_n$) in accordance with any desired order n and for accordingly determining the tool path feedrate (v or $x_2$) and the path (s or $x_1$) from the manipulated variable (u or $x_n$).

8. The method of claim 2, wherein the control sequence ($\vec{u}$) for travel toward a specified nominal velocity is determined in accordance with the following steps:
   (a) continuing the acceleration (a) at the maximum permissible jerk (r̂) for as long as it is not imminent that the maximum permissible acceleration (â) will be exceeded in a subsequent sampling period, and reducing the jerk (r̂) to the extent that the maximum permissible acceleration (â) is reached at the subsequent sampling instant;

(b) when the maximum permissible acceleration (â) is reached, continuing acceleration at this level toward nominal velocity ($v_{nominal}$);

(c) at the same time, continually checking, while retaining the current manipulated variable (u), whether the acceleration reached can be reduced to zero in the remaining sampling periods, within the framework of a look ahead at the subsequent sampling instant or also within an interval of following sampling instants, while allowing for given acceleration and jerk possibilities in the remaining sampling periods; and (d) if this is no longer the case for at least one of the sampling instants checked for future purposes, then reducing the acceleration (a) at the earliest sampling instant that precedes this sampling instant with as negative as possible jerk (r), wherever possible with the maximum permissible negative jerk (−r̂), so as to allow the nominal velocity ($v_{nominal}$) to be reached at the specified instant without overshooting it.

9. The method of claim 2, wherein the control sequence (u) for a deceleration into a specified target state is determined by the following steps:

(a) reducing to zero any still existing positive acceleration (a*) with an as negative as possible jerk (r) wherever possible with the maximum permissible, negative jerk (−r);

(b) establishing the negative acceleration (−a) required for the deceleration with an as negative as possible jerk (r), wherever possible with the maximum permissible negative jerk (−r);

(c) if the maximum permissible negative acceleration (−â) is reached, then continuing deceleration with this acceleration with a jerk (r) of zero;

(d) retaining while continually checking the current manipulated variable (u) within the framework of a look ahead at the following sampling instant or also within an interval of following sampling instants, whether the remaining path of the block is shorter than the required deceleration distance, while allowing for given acceleration and jerk possibilities in the remaining sampling periods; and (e) if this is the case for at least one of the sampling instants checked for future purposes, then the negative acceleration (−a) is reduced at the earliest sampling instant that precedes this sampling instant with as positive as possible jerk (r), wherever possible with maximum permissible positive jerk (+r), and the target state ($s_{nominal}$) is reached.

10. The method of claim 2, wherein the control sequence (u) for a deceleration into a specified target state is determined by the following process steps:

(a) reducing to zero any existing positive acceleration (a*) with an as negative as possible jerk (r), wherever possible with the maximum permissible negative jerk (−r);

(b) establishing the negative acceleration (−a) required for the deceleration with an as negative as possible jerk (r), wherever possible with the maximum permissible negative jerk (−r);

(c) retaining while continually checking the current manipulated variable (u), within the framework of a look ahead at the following sampling instant or also within an interval of following sampling instants, whether the remaining path of the block is shorter than the required deceleration distance, while allowing for given acceleration and jerk possibilities in the remaining sampling periods;

(d) if this is the case for at least one of the sampling instants checked for future purposes, then reducing the acceleration (a) at the earliest sampling instant that precedes this sampling instant with an as negative as possible jerk (r); and (e) if, in so doing, the maximum permissible acceleration (+â, −â) and/or the maximum permissible jerk (+r, −r) is exceeded, then increasing the number of sampling periods (v) for the deceleration operation so that the permissible acceleration limit (+â, −â) and/or jerk limit (+r, −r) is not undershot or is only undershot within a range of permissible tolerance, and the operative deceleration point is advanced by as many sampling instants needed so that the target state ($s_{nominal}$) is reached at an acceleration (a) and jerk (r) of zero.

11. The method of claim 5, wherein any still existing positive acceleration (a*) is reduced with as negative as possible jerk (r) to zero by means of discrete-time approximation from the continuously determined deceleration operation; and the negative acceleration (−a) required for deceleration is set up with as negative as possible jerk (r) likewise by means of discrete-time approximation from the continuously determined deceleration operation.

12. The method of claim 10, wherein any still existing positive acceleration (a*) is reduced with as negative as possible jerk (r) to zero by means of discrete-time approximation from the continuously determined deceleration operation; and the negative acceleration (−a) required for deceleration is set up with as negative as possible jerk (r) likewise by means of discrete-time approximation from the continuously determined deceleration operation.

* * * * *